Figure 1:
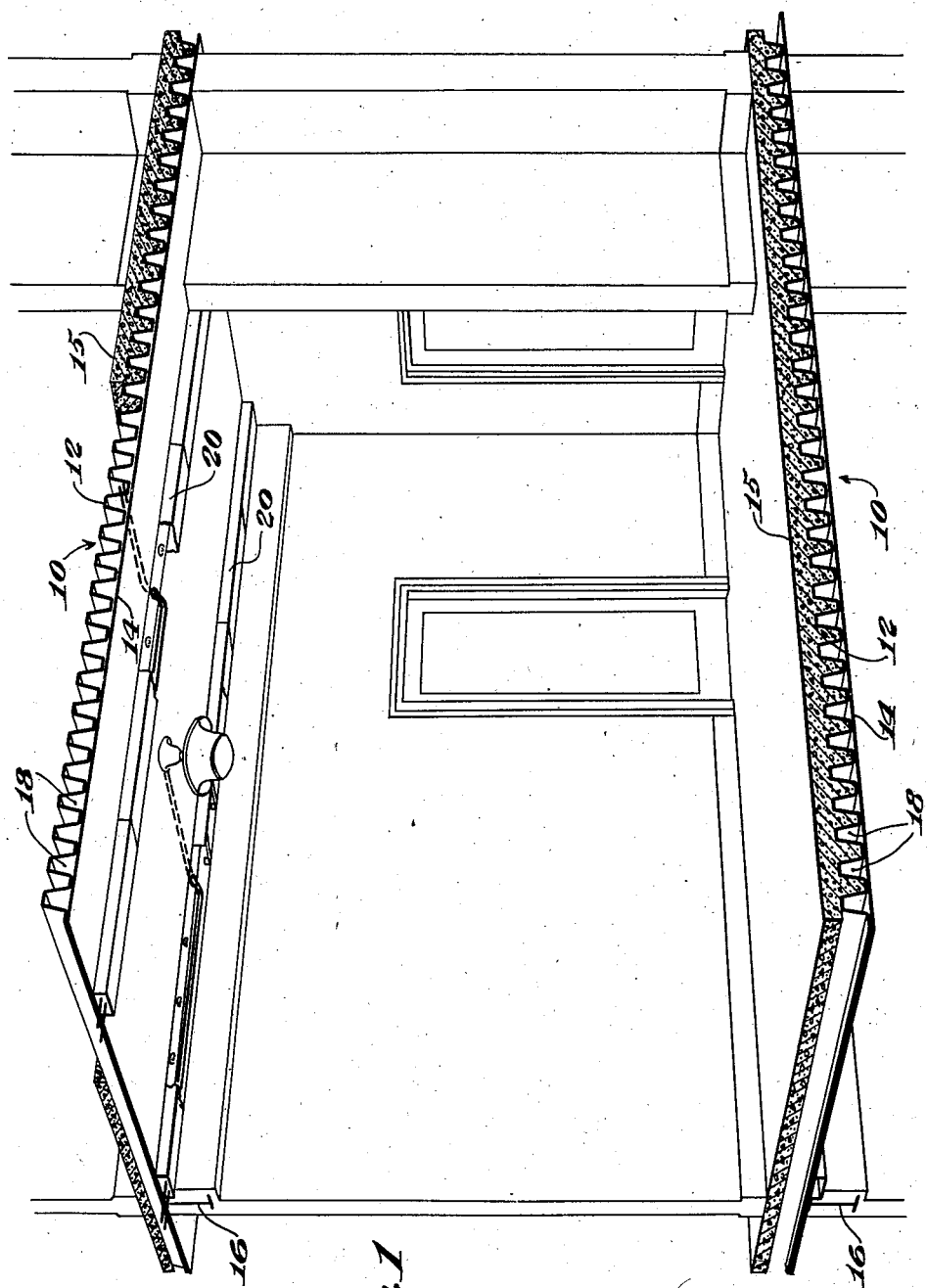

Oct. 21, 1941.   J. W. WIESMANN   2,259,674
WIRING CONDUIT AND WIRE DISTRIBUTION SYSTEM
Filed Jan. 13, 1939   2 Sheets-Sheet 1

INVENTOR
Joseph W. Wiesmann
BY J. Stanley Churchill
ATTORNEY

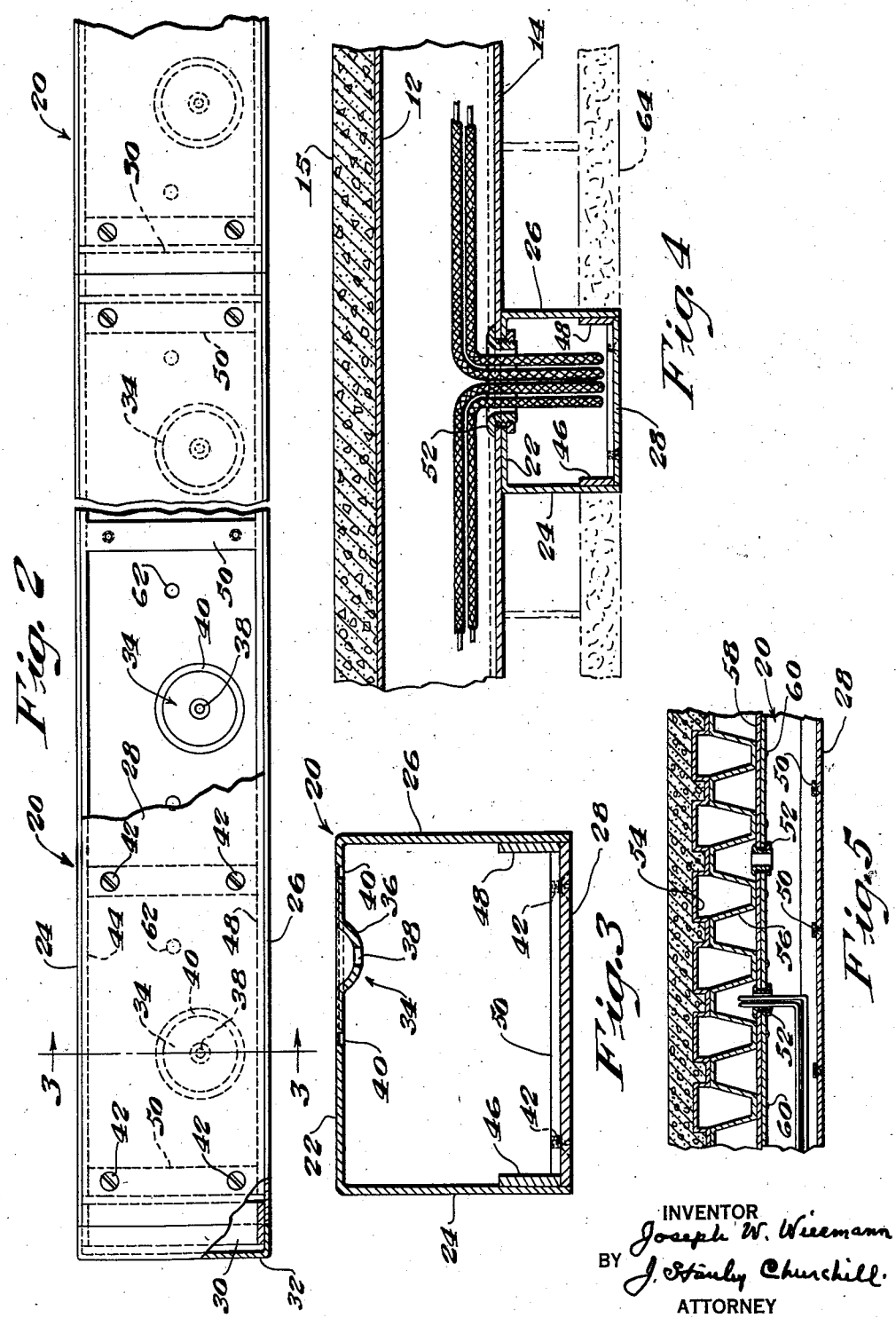

Patented Oct. 21, 1941

2,259,674

UNITED STATES PATENT OFFICE 2,259,674

WIRING CONDUIT AND WIRE DISTRIBUTION SYSTEM

Joseph W. Wiesmann, Pittsburgh, Pa., assignor to H. H. Robertson Company, Pittsburgh, Pa., a corporation of Pennsylvania Application January 13, 1939, Serial No. 250,699

2 Claims. (Cl. 189—34)

This invention relates to a wiring conduit and wire distribution system for buildings having a multicellular floor.

The invention has for an object to provide a novel and improved wire distributing system embodying a cross-over wiring duct of novel construction and the cells of a multicellular floor and by which wiring may be economically and efficiently furnished to points selected for service outlets in the different parts of the floor.

To this end, the invention contemplates the provision of a cross-over duct mounted to extend transversely of and along the underside of the multicellular floor, and the cross-over duct is provided with prefabricated pilots spaced so as to align with selected of the cells disposed above the duct and by which the completion of an entrance hole through the duct and into the selected cell is greatly facilitated and whereby the correct location of a particular selected cell may be positively determined.

With this general object in view and such others as may hereinafter appear, the invention consists in the wire distributing system and in the cross-over duct and in the various structures, arrangements and combinations of parts hereinafter described and particularly defined in the claims at the end of this specification.

In the drawings illustrating the preferred embodiments of the invention, Fig. 1 is a perspective view of a portion of a building showing the multicellular floor broken away and the cross-over ducts in place; Fig. 2 is an inverted plan view of a cross-over duct embodying the present invention; Fig. 3 is a cross-sectional view on the line 3—3 of Fig. 2; Fig. 4 is a longitudinal sectional view through a portion of the floor showing a cross-over duct in communication with one of the cells of the floor, and Fig. 5 is a cross-sectional view showing a cross-over duct combined with a different type of multicellular floor.

In general, the preferred embodiment of the present invention relates to the wire distributing system disclosed in the United States patents to J. H. Young No. 1,855,082, dated April 19, 1932, and No. 2,125,366 dated August 2, 1938, and is designed to permit electrical service to be furnished selected of the floor conduits in a simple, economical and convenient manner. To this end, the cross-over duct of the present invention is mounted to extend transversely of and along the underside of the multicellular metallic flooring and provision is made in the improved duct for facilitating the completion of an entrance hole into any one or more of selected of the flooring cells positioned above the duct. In the preferred form of the invention, the cross-over duct is provided with a plurality of prefabricated pilots spaced in predetermined relation to one another and to the cell spacing of the metal flooring under which the duct is or is to be mounted, so that the pilots are in alignment with selected cells of the floor. The pilots serve as markers to indicate the exact location of a flooring cell thereby eliminating any difficult measurement or guess work in tapping into the proper cell when it is required to supply service to selected points in the building. The preferred pilots are particularly designed for the reception of a tool for completing an opening through the duct and into the cell above whereby such opening may be quickly and conveniently made. In practice, only the required openings are made, the remaining pilots being available for future service as required. Provision is also made in the perferred embodiment of the invention for preventing access to any cell other than such as are selected for a particular branch of service, so that when two or more types of service are contemplated the proper cells for the distribution of such service may be easily identified and provide complete isolation of the different types of electrical service.

Referring now to the drawings, 10 represents one type of cellular metal flooring now being manufactured under the Young patents above referred to and used in the erection of buildings and which as herein shown comprises a plurality of units formed by assembling and uniting together an upper corrugated sheet 12 and a lower sheet 14 to form in effect a series of closely spaced parallel, hollow beams or cells upon the top of which a concrete fill and finish flooring 15 is laid, as illustrated in Fig. 1. In practice, it is preferred to manufacture the cellular metal floor in units of varying lengths according to the steel fabrication of the building in which the floor is to be incorporated, and during the erection of the floor the units are laid end to end, preferably being supported upon girders 16 so that the joints between the ends of adjacent units come over the girders 16 and so that the cells of one unit cooperate with and form extensions of the cells of a second unit to provide a plurality of continuous conduits extending across the building and through which wiring for electrical service of various types may be drawn as set forth in the Young Patent No. 1,855,082, above referred to.

The cells or conduits 18 of the multicellular floor, it will be observed, are spaced a relatively short distance apart, and, in practice, the cells may be spaced upon six inch centers so that when the location of one cell in the flooring is determined, the correct location of adjacent or distant cells, concealed beneath the floor covering or ceiling may be easily determined by measurement. In accordance with the present invention, the electrical wiring is led through a cross-over duct 20 provided with preformed pilots spaced in accordance with the spacing of the cells of the floor or a multiple thereof so that access to predetermined ducts for the distribution of wiring for a particular type of service, may be greatly simplified. Thus, the preformed pilots may serve as markers to determine the correct location of any floor cell selected for the distribution of the wiring without any difficult measuring and greatly facilitating the work of providing additional outlets for future requirements of the distribution system.

As illustrated in detail in Figs. 2 and 3, the preferred form of the improved duct comprises an elongated, hollow rectangular shaped conduit 20, having an upper wall 22 and side walls 24, 26, and which is preferably enclosed along the bottom by a cover member 28. The duct may be made in any suitable length, convenient for handling and installation purposes, and provision is made for joining one duct to another to form a continuous length, and, as herein shown, a sleeve member 30, secured to one end of the duct, may be provided, which is adapted to fit into the end of a second conduit. An end cover member 32 may be provided to enclose the open end of the duct, and may be provided with a sleeve 30 of a size to fit into the open end of the duct, as shown.

As herein shown, the upper wall 22 of the duct is provided with a plurality of prefabricated spaced pilots indicated generally at 34 and which are particularly adapted for the reception of a tool, such as a hole saw, to guide the tool when it is desired to complete an opening from the duct 20 into a cell positioned above. As herein shown each pilot may comprise a depressed portion 36, having a hole 38 in the center which serves as the centering point for the tool, and a grooved portion 40, concentric with the centering hole 38. The grooved portion 40 is of the same diameter as the circular saw portion of the hole saw so as to serve as a guide and to assist in completing an entrance into the cell positioned above.

The cover member 28 which extends along the bottom of the duct is preferably made in sections or lengths convenient for access to the ducts at any particular point, and, as herein shown, each section is attached to the duct by screws 42 which are received in a frame member, comprising side members 46, 48 and cross tie members 50 which may be welded or otherwise secured to the duct. The cross members 50 of the frame are preferably arranged to be disposed in predetermined relation to the pilots 34 in the duct and preferably in the space between successive pilots, so that the cross members may serve as a barrier to interfere with or prevent entrance into the floor duct at the points where the cross members occur. This feature of the invention is particularly useful, when two or more cross-over ducts are used to accommodate different types of service, for in such event the pilots may be arranged in one duct for entrance into alternate cells (where two types of service are contemplated) and likewise the second duct may have the pilots arranged for entrance into different alternate ducts so that the cross-bars 50 of one duct occur under the cells selected for the second duct, whereby an entrance into the wrong duct is prevented and the different types of service may be isolated.

Only the necessary openings through the duct and into a cell are completed, the remaining pilots being available for future requirements, and as herein shown, when an opening is completed, it may be provided with the usual bushing such as a grommet 52 to provide a smooth edge around the opening and through which the wiring may be drawn, without danger of injury to the wires.

It will be observed that the pilots 34 are preferably disposed slightly off the longitudinal center line of the cross-over duct and slightly to one side of the duct so as not to interfere with existing wiring in the duct when additional outlets or entrance holes are required to be completed.

As shown in Fig. 5, the cross-over duct 20 of the present invention may be embodied in other types of multicellular flooring, the illustrated flooring comprising upper and lower corrugated members 54, 56 and having a ceiling plate 58 onto which the duct is attached. As shown in Fig. 5, the duct may be attached and held in place by screws 60 which may extend through preformed holes 62 (see Fig. 2) and into holes tapped in the ceiling plate in the field. The present duct is adapted to be installed in existing structures by simply attaching the duct to the ceiling or underside of the flooring with the pilots aligned with those cells it is desired to be tapped into for service and then completing the required openings from the duct into such cells. The wires may be drawn through the cells to supply service to either ceiling or floor outlets as required. As shown in Fig. 4, the duct 20 may be installed flush with any additional ceiling structure 64, shown in dotted lines, if desired.

While the preferred embodiment of the invention has been herein illustrated and described, it will be understood that the invention may be embodied in other forms within the scope of the following claims.

Having thus described the invention, what is claimed is:

1. The combination with a multicellular floor having longitudinally extended cells forming potential wiring ducts, of a cross-over duct extending transversely of said cells comprising an elongated hollow member having an upper wall adjacent the underside of said floor, side walls, and a cover member enclosing the bottom of the duct, a frame member having a plurality of cross members to which said cover member is affixed, said upper wall having a plurality of prefabricated pilots spaced in alignment with selected of said longitudinally extended cells and designed to facilitate the completion of an opening through the duct and into said selected cells, said cross members being spaced between said pilots and in alignment with other cells to serve as barriers to prevent entrance into said other cells.

2. The combination with a multicellular floor having longitudinally extended cells forming potential wiring ducts, of a cross-over duct extending transversely of said cells comprising an elongated hollow member having an upper wall adjacent the underside of said floor and a cover member comprising the bottom wall thereof, said upper wall and the adjacent wall of the cell being provided with aligned openings for affording communication between the interior of the hollow member and the cell and a plurality of prefabricated pilots formed in said upper wall and spaced in alignment with selected of said longitudinally extended cells, said pilots being designed to facilitate the completion of an opening through said duct and into said cells, and a plurality of cross members spaced between said pilots and in alignment with other cells to serve as barriers to prevent entrance into said other cells when the cover member is removed.

JOSEPH W. WIESMANN.